Aug. 28, 1951  U. C. HAREN ET AL  2,565,684
METHOD AND APPARATUS FOR MAKING ENDLESS BELTS
Filed April 1, 1946  2 Sheets-Sheet 1
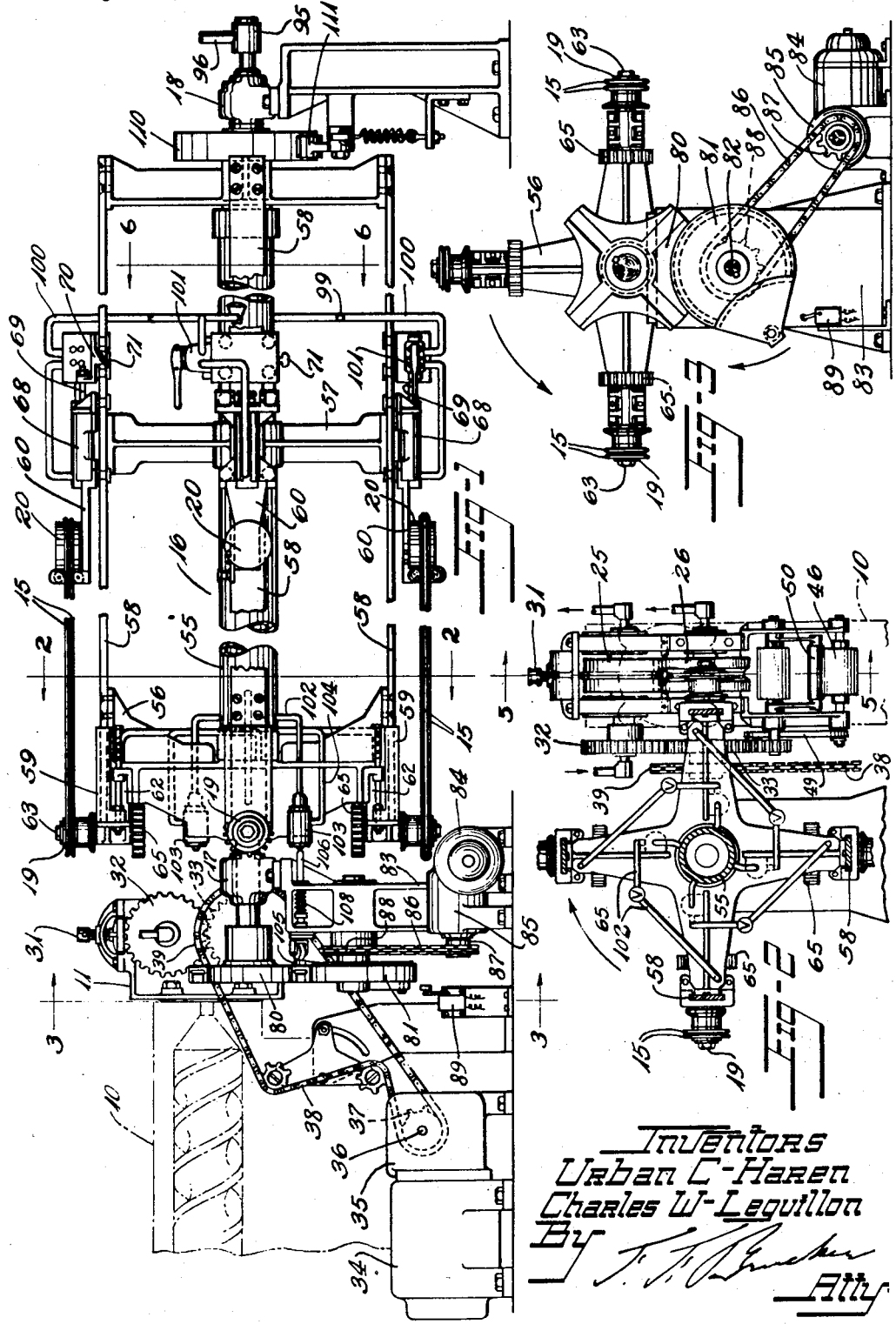
Inventors
Urban C. Haren
Charles W. Lequillon
By
Atty

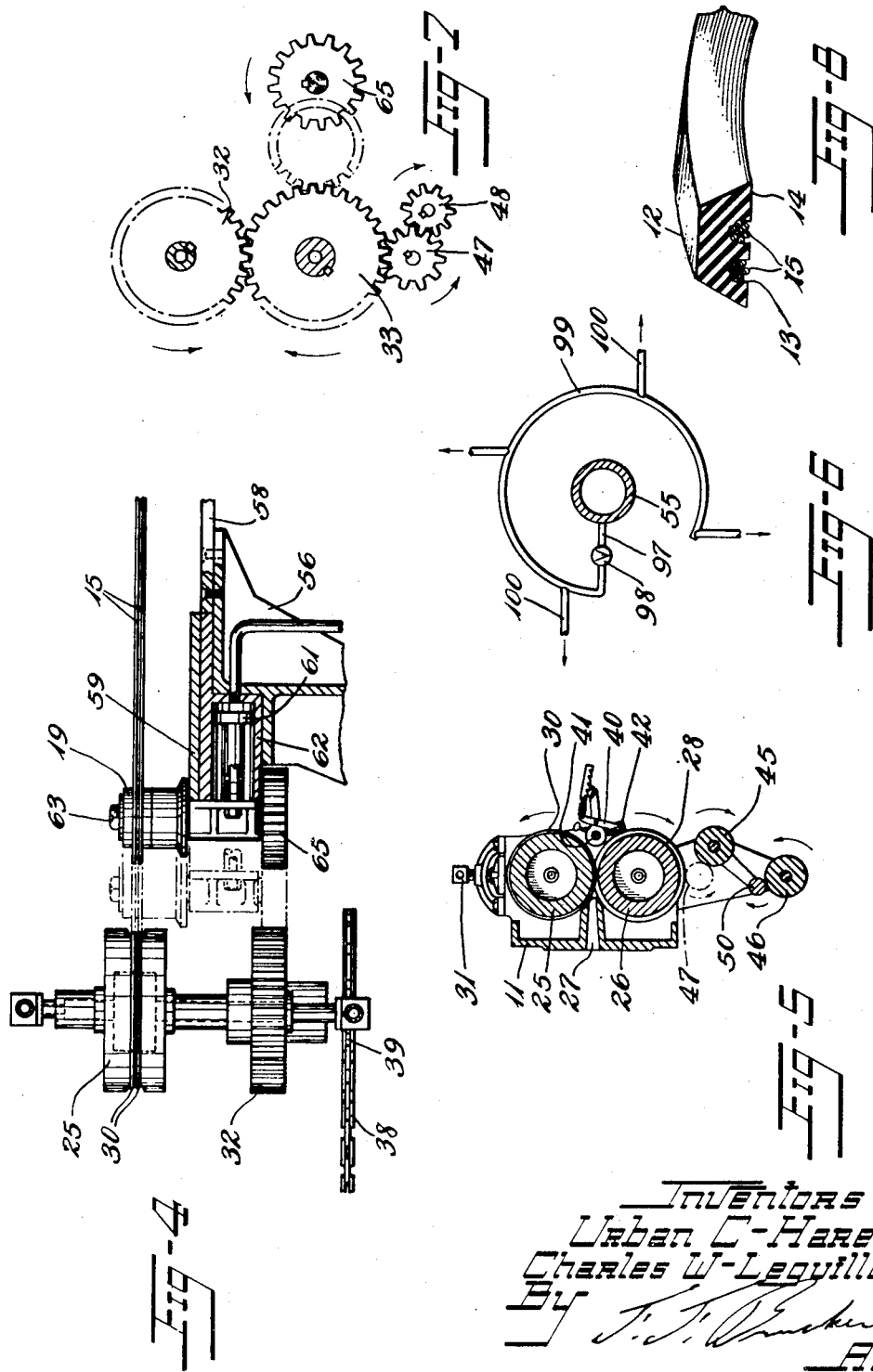

Patented Aug. 28, 1951

2,565,684

UNITED STATES PATENT OFFICE 2,565,684

METHOD AND APPARATUS FOR MAKING ENDLESS BELTS

Urban C. Haren and Charles W. Leguillon, Akron, Ohio, assignors to The B. F. Goodrich Company, New York, N. Y., a corporation of New York Application April 1, 1946, Serial No. 658,788

9 Claims. (Cl. 154—3)

1

This invention relates to the manufacture of endless belts and is especially useful in the manufacture of belts having endless grommets incorporated therein.

In the Freeman Patent No. 1,969,067 it was proposed to stretch grommets about a pair of grooved pulleys, to force a plain surfaced roller against one of the pulleys, while driving the pulley, and to feed unvulcanized sheet rubber between the grommets supported by the grooved pulley and the plain faced roller to embed the grommets in the sheet material. Such apparatus had the disadvantages of the grooved pulley interfering with complete embedding of the grommets in the rubber, the tendency of the rubber, which had not been preformed, to refuse to conform permanently to the grommets, but to spring away from them, the lack of any means for tensioning the belts a determinate amount, and the necessity of trimming the belt from a sheet.

In the pending application of Benjamin A. Evans, Serial No. 486,663, now Patent No. 2,439,043, it is proposed to extrude a strip of unvulcanized rubber or other rubber-like material to the desired cross section of belt core having parallel grooves in one face for receiving grommets, then to apply a cut length of the strip supported by a strip of fabric cover material to grommets supported on spaced-apart pulleys, then to apply a strip of rubber over the open sides of the grooves and to fold the fabric cover about the assembly. The proposed method was an improvement over the method of the Freeman patent, but had the disadvantage of not determinately tensioning the grommets as the rubber-like material is applied thereto, and of not applying the strip directly as it is formed to the grommets so as to take advantage of the adhesive and plastic nature of the formed-in-place strip and of the natural shrinkage in conforming the strip to the grommets.

It is an object of the present invention to avoid the disadvantages of the prior art methods and to provide for forming a strip of rubber-like material and while it is in a plastic condition and supported by a forming member directly engaging it with the determinately tensioned grommets.

Other objects of the invention are to provide for supporting and determinately tensioning a plurality of sets of belt grommets, to provide for advancing the sets of grommets in succession to an extruding machine, in tensioned condition, to provide positive driving of the grommets from the extruding machine as they are successively aligned therewith to provide adjustment of the supporting pulleys for placement and replacement

2 of the grommets, to provide individual tensioning of each set of grommets, and to provide belts of uniform volume and cross-section.

These and other objects will appear from the following description and the accompanying drawings.

Of the drawings:

Fig. 1 is a side elevation of apparatus constructed in accordance with and embodying the invention, parts being broken away, part of the extruding machine being indicated in dot and dash lines.

Fig. 2 is a sectional view thereof taken on line 2—2 of Fig. 1, parts being broken away.

Fig. 3 is a sectional view taken on line 3—3 of Fig. 1.

Fig. 4 is a partial plan view showing, in full lines, the retracted position of the reel and, in dot and dash lines, the advanced position thereof, parts being broken away.

Fig. 5 is a cross sectional elevation of the forming rolls.

Fig. 6 is a detail view of the air connections of the reel.

Fig. 7 is a side elevation of the driving gear train.

Fig. 8 is a perspective view of a section of the belt as it comes from the apparatus.

Referring to the drawings, the invention makes use of a strip forming mechanism such as a screw type extruding machine 10 which delivers plastic unvulcanized rubber or other rubber-like plastic material to a roller die apparatus 11 where the plastic is formed to provide a continuous strip 12 (see Fig. 8) having grooves 13 in one face 14 thereof for receiving endless grommets 15. The grommets 15 are supported by a reel 16 mounted for rotation about a horizontal axis by bearings 17, 18. The reel supports a plurality of sets of driving sheaves 19 and tensioning idler sheaves 20 about which the grommets 15 are trained in properly spaced apart relation for receiving the rubber-like material and the sets of grommets are arranged to be individually tensioned, advanced into alignment with the forming rolls and driven in synchronism therewith while the strip 12 of rubber-like material is formed and applied thereto in warm plastic condition thereby providing good adhesion to the grommets.

For forming the strip material, the roller die 11 which is of the type shown in the Farrington patent, No. 1,919,361, is mounted on the delivery end of the extruder 10 and has a pair of driven forming rolls 25, 26 for cooperation with a feeding nozzle 27. These rolls are hollow and are provided with means for circulating steam and cold water therethrough for controlling their temperature. The lower roll 26 is the driver and is formed with a peripheral groove 28 therein for forming the obtuse angled back face and sides of the strip 12, while the upper driven roll 25 is formed with peripheral ribs 30, one for forming each groove 13 of the grooved face of the strip 12 to receive the grommets 15.

The faces of rolls 25, 26 cooperate with each other to define the extrusion opening which forms the plastic strip 12 and the strip proceeds from the position of contact of the rolls with each other about the roll 26 into contact with the grommets supported by the sheave 19 where it is adhered to the grommets. The roll 26 supports the strip 12, which is in a hot, soft plastic state, throughout its travel from the strip forming position to the position where it contacts sheave 19, the groove 28 supporting the strip against stretch or other distortion.

The upper roll is adjustable toward and from the lower roll 26 for changing the volume and thickness of the strip 12, and adjusting screws 31 are provided for this purpose. A gear 32 fixed to the roll neck of roll 25 meshes with a gear 33 fixed to the roll neck of roll 26 for driving the rolls at uniform surface speeds. Power is supplied by a motor 34 through a speed reducer 35 having a driven shaft 36 with a sprocket 37 fixed thereto. A chain 38 engages the sprocket 37 and also a sprocket 39 fixed to the roll neck of roll 26 for driving the rolls.

For trimming away the flash of material at the margins of the strip, a pair of knife holders 40 are adjustably mounted on a cross rod 41 supported by the roller die and support knives such as razor blades 42 which are spring pressed against roll 26 and trim the flash from the strip as the strip is supported in the groove 28 of the roll 26.

For drawing away the trimmed flash, power driven rolls 45, 46 are provided below roll 26. Roll 45 is driven from gear 33 through an idler gear 47 meshing therewith and a gear 48 fixed to roll 45. Roll 46 is driven from roll 45 by a belt 49 which engages pulleys fixed respectively to gears 47 and roll 46. A pressure roll 50 is spring pressed against roll 46 to grip the trimmings. The trimmings are led about rolls 45, 46 and between rolls 46 and 50 to draw it away from the forming rolls.

The reel 16 has a hollow tubular axle 55 which provides a convenient storage chamber for compressed air for operating certain parts of the mechanism. Mounted on the axle in axially spaced apart relation are a pair of spider 56, 57 to the arms of which are secured rails 58 extending axially of the reel. Each rail slidably supports a pair of carriages 59, 60.

Each carriage 59 is connected to a piston 61 operating in an axially disposed cylinder 62 fixed to the spider 56. It carries a shaft 63 disposed radially of the reel for rotation in a bearing formed in the carriage. The sheave 19, previously mentioned, having spaced apart peripheral grooves for supporting the grommets 15, is fixed to one end of the shaft, and a pinion 65 is fixed to the other end of the shaft. The arrangement is such that when the carriage is advanced in a direction to the left of Fig. 1 or to the dot and dash position of Fig. 4 where the grommets engage the grooves of the strip material supported in the groove of roll 26, the pinion 65 will be meshed with gear 33 and sheave 19 will be driven thereby at the same velocity as that of the roll 26, and when the carriage is withdrawn to the full line position of Figs. 1 and 4, the reel may be rotated about its axis and the pinion 65 will clear the roller die mechanism.

Each carriage 60 has a fixed stud upon which a peripherally grooved sheave 20 is mounted for free rotation in alignment with the sheave 19. It also supports a cylinder 68, the piston 69 of which is secured to a clamping carriage 70 slidably mounted on the rail 58 and clamped thereto by a screw 71. The arrangement is such that the clamping carriage may be moved and clamped in any position to accommodate grommets of any length and the carriage 60 may then be moved with respect thereto by pressure fluid admitted to cylinder 68 to tension the grommets on the sheaves.

For rotating the reel step by step and thereby aligning sets of grommets with the roller die, a Geneva stop motion gear 80 having as many stop positions as the number of arms of the spiders 56, 57 is fixed to the axle 55 and its driver 81 is fixed to a shaft 82 journaled in a frame 83 which supports bearing 17. A motor 84 drives the driver 81 through a reduction gear 85 by means of a chain 86 and sprockets 87, 88 on the reduction gear and shaft 82 respectively. The motor is adapted to be started by hand manipulation of a starting switch. A limit switch 89 is located electrically in the motor circuit and mechanically in the path of the driver 81. The arrangement is such that when the starting button (not shown) is depressed, the motor turns the driver 81 through one revolution during which the limit switch is contacted and opens the motor circuit stopping the reel at the next position.

As herein mentioned, the axle 55 of the reel is used as a reservoir for compressed air. A slip connection 95 at one end thereof is connected to a compressed air supply line 96. A pipe 97 (see Fig. 6) connects the storage reservoir with a reducing valve 98 which in turn feeds a manifold 99 from which branch pipes 100 extend to hand operated three-way valves 101 controlling flow of compressed air to cylinders 68. The arrangement is such that air under pressure may be admitted at will to either end of each cylinder 68 to move the sheave 20 in a direction to the right in Fig. 1 to tension the grommets carried thereby, or in the opposite direction to release the tension thereon.

The supply of compressed air for each cylinder 62 is also taken from the reservoir 55. For this purpose a pipe 102 extends from the reservoir to a spring operated shut-off valve 103 from which a pipe 104 extends to the cylinder. The valves 103, one for each cylinder, are so located on the reel spider 56 that as one set of grommets is aligned with the roller die its control valve 103 will be aligned opposite a plunger 106 slidably mounted on the frame 83. A cam 105 is mounted on the driver 81 and is adapted to press the plunger 106 against the valve, thereby admitting air to cylinder 62 to advance the gear 65 into mesh with gear 33 and the sheave 19 into contact with the roll 26. The arrangement is such that when the motor 84 is started by the manually controlled starting switch, thereby rotating the driver 81 through a single revolution, the plunger 106 is released, and retracted by a spring 108, closing the supply valve and exhausting cylinder 62, thereby retracting the sheave and pinion to the position shown in Fig. 1, whereupon the reel indexes to the next position. Just before reaching that position the next valve 103 is opened advancing the next gear 65 into mesh with the gear 33. For preventing overrun of the reel, a brake drum 110 is fixed to the reel, and a brake 111 is provided to engage it.

In the operation of the apparatus, an operator at the side of the reel operates the valve 101 to move the sheave 20 toward the sheave 19 of a set of sheaves, and then places the endless grommets about sheaves 19 and 20. Then the operator adjusts the valve 101 to tension that set of grommets. Another operator advances the reel by starting motor 84. The reel advances one step and the first operator loads the next pair of sheaves in the same manner. As a sheave carrying grommets moves to the extruding position, it is automatically advanced against the roller die. The operator at the extruder cuts the extruded strip to provide an end which is picked up by adhesion to the grommets and led thereby about the sheaves. As the first end again approaches the die, the operator cuts the strip and advances the reel to carry the covered grommets away and to bring up a set of uncovered grommets.

Pressure of air to cylinders 68 is kept at a lower pressure than that to cylinders 62 so that as sheaves 19 are advanced toward the roller 26 the sheave 20 is moved in the same direction by tension of the grommet, the tension of the grommet being controlled by the difference in pressure of the two cylinders. This difference in pressure is controlled by the setting of valve 98.

The hot plastic material from the roller die is fed directly onto the grommets without stretch as the grommets lift it off the roll 26 and are driven at the same surface speed. The rubber-like material adheres to the grommets with great tenacity obviating the necessity for use of cement, and shrinkage of the rubber tends to bind it more closely about the grommets.

As the operator removes a finished covered set of grommets she replaces it with a new set of uncovered grommets.

Variations may be made without departing from the scope of the invention as it is defined by the following claims.

We claim:

1. Apparatus for making an endless belt, said apparatus comprising sheaves for supporting an endless grommet, means for determinately tensioning the grommet by applying a constant tensioning force to one of the sheaves, means for progressively forming a grooved strip of rubber-like material, said forming means comprising rotatable rollers providing a die opening therebetween, one of said rolls being arranged and adapted to support the formed strip thereon to a position of contact of the strip with a grommet supported by one of said sheaves, means for feeding the determinately tensioned grommet progressively past the forming means in synchronism with said forming means, and means for applying pressure between said forming means and the supported grommet to adhere the grommet and the formed strip to each other while the strip is in a plastic condition and supported by the forming means.

2. Apparatus for making endless belts, said apparatus comprising a roller die having strip forming rolls for progressively forming a grooved strip of rubber-like material, one of said rolls being arranged and adapted to support the formed strip after it has been formed, a reel having sheaves for supporting sets of endless grommets, means for advancing the reel step by step to align the sets of grommets successively at said strip forming means with the strip supporting roller, and means for driving said sheaves at the forming position to advance the grommets with said strip engaging thereabout.

3. Apparatus for making endless belts, said apparatus comprising roller die means including a pair of driven rollers defining therebetween a die opening for forming a strip of plastic material, a reel having sheaves for supporting sets of endless grommets, means for advancing the reel step by step to align the sets of grommets successively at said roller die means with one of said rollers supporting said strip, and means for driving said sheaves at the forming position to advance the grommets with said strip engaged thereabout, said means for driving the sheaves comprising a gear fixed to one of said sheaves, and means for advancing and retracting said gear with said sheave into and out of mesh with a gear of said roller die.

4. Apparatus for making an endless V-belt having laterally spaced apart endless grommets therein, said apparatus comprising an extruding means for extruding plastic rubber-like material, said extruding means including power driven rollers defining a die opening therebetween for forming a continuous strip having laterally spaced apart grooves in a face thereof, one of said rollers being arranged and adapted to support the strip after it has been formed, a reel having spaced apart grooved sheaves for supporting belt grommets in a spaced apart relation corresponding to the spacing of the grooves of the strip, means for advancing the reel step by step about its axis to align sets of grommets with said strip supporting roller, means for driving said sheaves at said aligned position to adhere them to the extruded strip, and means for tensioning the grommets as the extruded material is applied thereto.

5. A reel for supporting and tensioning endless grommets at an extruding means progressively forming a strip of rubber-like material, said extruding means including a pair of cooperating strip forming rollers, one of said rollers being arranged and adapted to support the formed strip on its face, said reel comprising sheaves for supporting grommets in spaced-apart relation, means for tensioning grommets supported by said sheaves, means for rotating the reel step by step to align sets of grommets with the formed strip on said strip supporting roller, and means for advancing the sheaves with the grommets tensioned thereon with relation to said reel into contact with the strip without changing their tensioned condition.

6. The method of making an endless belt which comprises progressively forming plastic rubber-like material to provide a strip of the material having a longitudinal groove therein, advancing the formed plastic strip with its groove exposed without removing the formed strip from contact with the forming means while supporting the strip against distortion, and progressively positioning an endless grommet of reinforcing material in the groove with the grommet contacting the plastic material defining the groove while the strip is so supported against distortion.

7. The method of making an endless belt which comprises progressively extruding plastic rubber-like material at a forming position to provide a strip of the material having a longitudinal groove therein, progressively advancing the formed plastic strip from the forming position to an assembling position with its groove exposed while continuously supporting the strip against distortion by continuous contact of the forming means, and progressively positioning an endless grommet of reinforcing material in the groove at the assembling position with the grommet contacting the plastic material defining the groove of the strip while the strip is so supported against distortion.

8. The method of making an endless belt which comprises progressively extruding plastic rubber-like material between rollers to provide a strip of the material having a longitudinal groove therein, progressively advancing the formed plastic strip from the forming position about one of the forming rollers with its groove exposed while continuously supporting the strip against distortion by contact with the roller, and progressively engaging an endless grommet of reinforcing material in the groove of the strip while the strip is supported by the roller against distortion.

9. Apparatus for making an endless belt, said apparatus comprising means for progressively forming plastic rubber-like material to provide a strip of the material having a longitudinal groove therein, said forming means including as a part thereof a forming roller for shaping and advancing the plastic strip with its groove exposed while supporting the strip against distortion, means for determinately tensioning and supporting an endless grommet of reinforcing material, the tensioning and supporting means including a sheave about which the grommet is trained, means for progressively positioning the grommet supported by said sheave in the groove of the strip supported by said roller, the positioning means including means for driving said roller and said sheave at the same speed.

URBAN C. HAREN.
CHARLES W. LEGUILLON.

REFERENCES CITED

The following references are of record in the file of this patent:

UNITED STATES PATENTS

| Number | Name | Date |
|---|---|---|
| 894,790 | Ackerman | July 28, 1908 |
| 1,586,737 | Geyer | June 1, 1926 |
| 1,969,067 | Freeman | Aug. 7, 1934 |
| 2,137,887 | Abbott | Nov. 22, 1938 |
| 2,239,635 | Walton | Apr. 22, 1941 |
| 2,439,043 | Evans | Apr. 6, 1948 |